A. ZIMMERER.
Rope Fastener.
No. 236,523.  Patented Jan. 11, 1881.
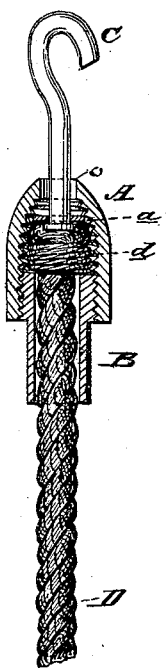

UNITED STATES PATENT OFFICE.

ANTON ZIMMERER, OF NEBRASKA CITY, NEBRASKA.

ROPE-FASTENER.

SPECIFICATION forming part of Letters Patent No. 236,523, dated January 11, 1881.

Application filed December 15, 1879.

*To all whom it may concern:*

Be it known that I, ANTON ZIMMERER, of Nebraska City, in the county of Otoe and State of Nebraska, have invented a new and Improved Rope-Fastener, of which the following is a specification.

The drawing represents a vertical sectional elevation of the device.

Similar letters of reference indicate corresponding parts.

My invention consists of the combination of devices hereinafter explained and claimed.

In the drawing, A represents the thimble or socket, preferably of malleable iron; and B, the sleeve or tube that screws into the said thimble A.

C is the swivel-hook, snap, eyebolt, or other suitable device held in the thimble A by a burr, $a$, or in some other convenient manner.

The end of a rope, D, being enlarged by knotting or service, as shown at $d$, is entered into the thimble A, and held there by the sleeve B, which is put over the said rope and pushed up to the knot or service and screwed into the said thimble A, as shown. The hook or other device C serves to secure this end of the rope to any object.

This device may be used with much advantage and convenience on the ends of clothes-lines and on all lines and ropes that ordinarily require much tying and untying.

Having thus described my invention, I claim as new and desire to secure by Letters Patent—

The combination of the externally-threaded sleeve B, provided with an outward enlargement, and an internally-threaded cap, A, sufficiently larger than the sleeve to receive the knot of the rope when the sleeve is screwed into the cap, and also provided with the opening $o$, substantially as herein described.

ANTON ZIMMERER.

Witnesses:
PAUL SCHMINKE,
J. C. SCHMINKE.